April 15, 1952 R. E. McLEAN 2,592,934
CAN OPENER
Filed Feb. 12, 1947 4 Sheets-Sheet 1
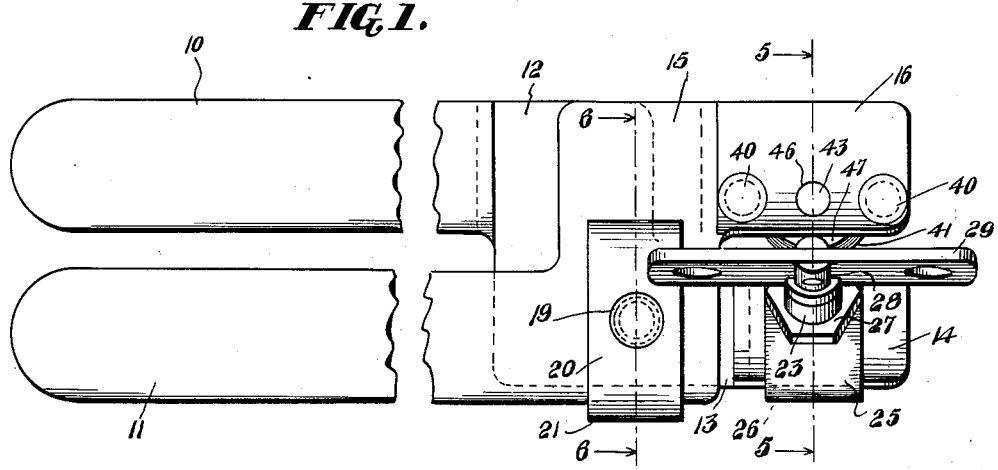
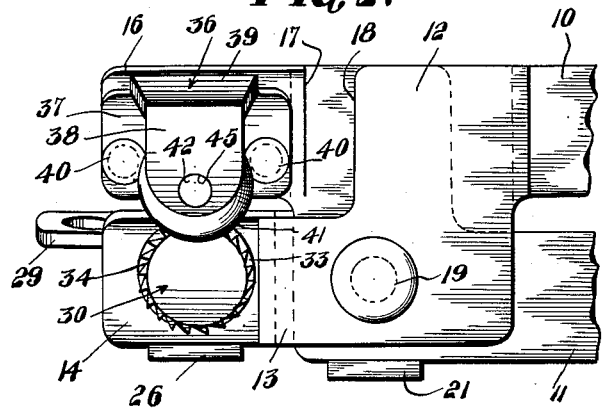
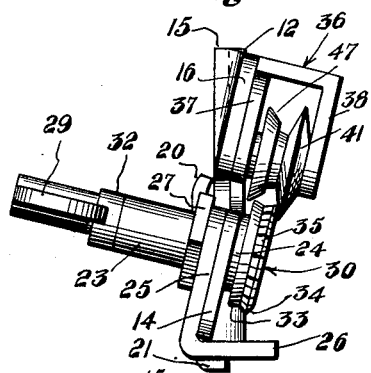
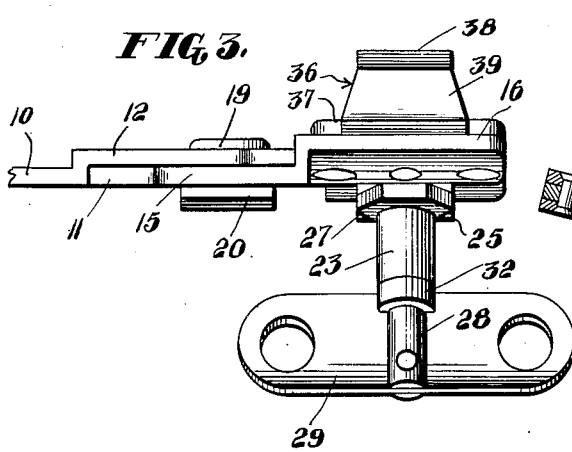
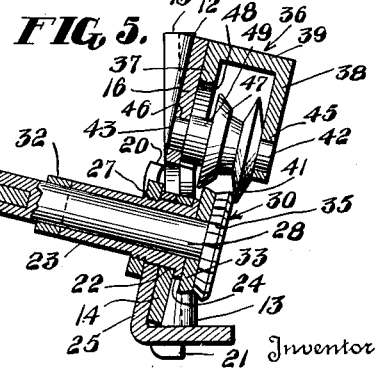
Inventor
Robert E. McLean
By Wilfred E. Lawson
Attorney April 15, 1952 — R. E. McLEAN — 2,592,934
CAN OPENER
Filed Feb. 12, 1947 — 4 Sheets-Sheet 2
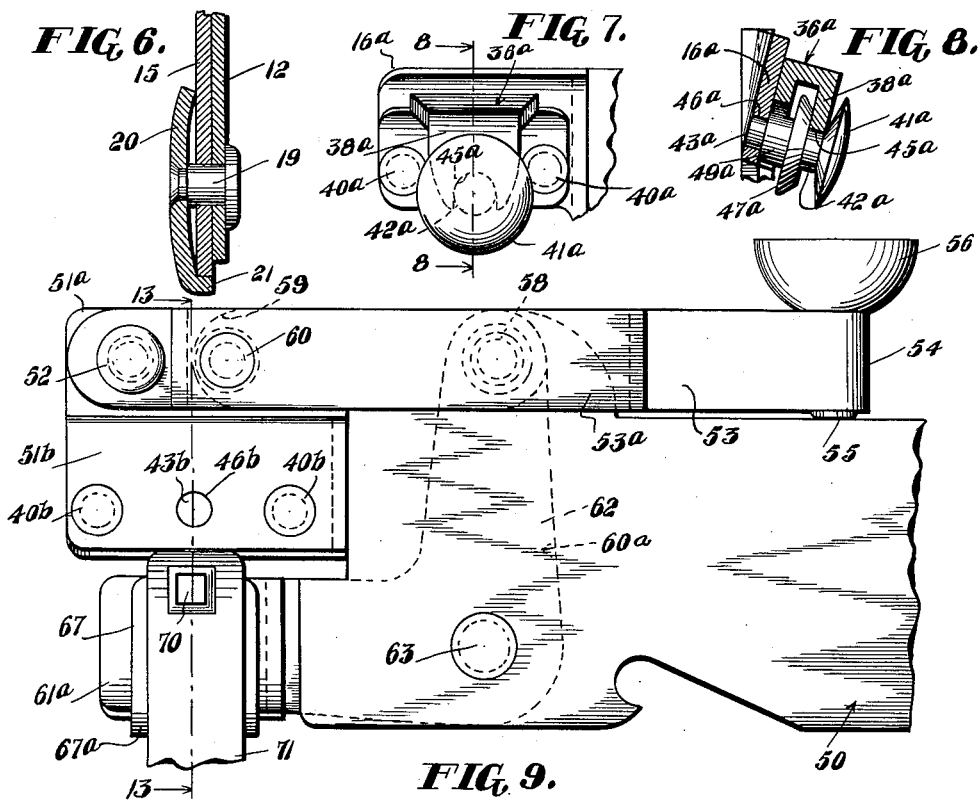
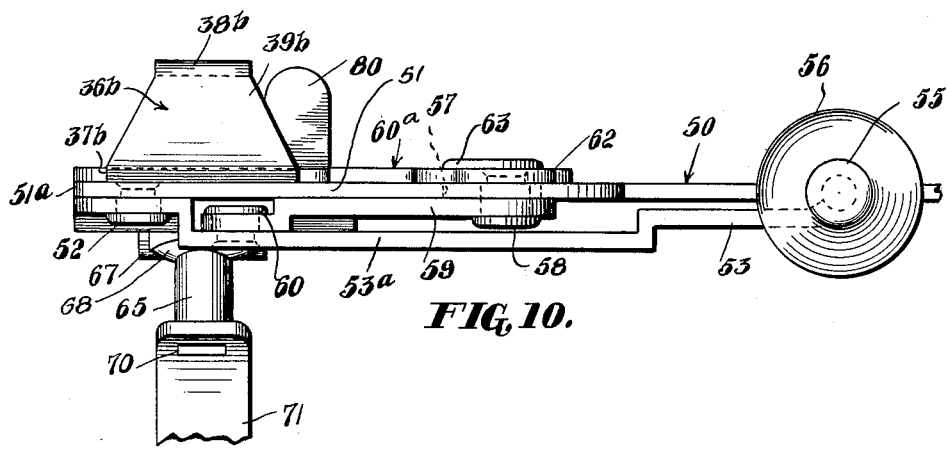
Inventor
Robert E. McLean
By Wilfred E. Lawson
Attorney

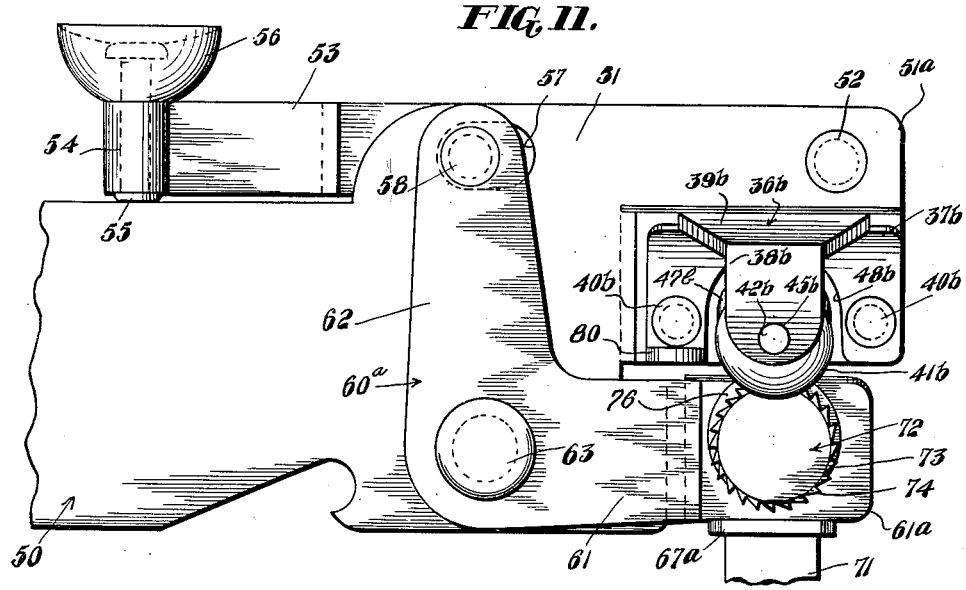
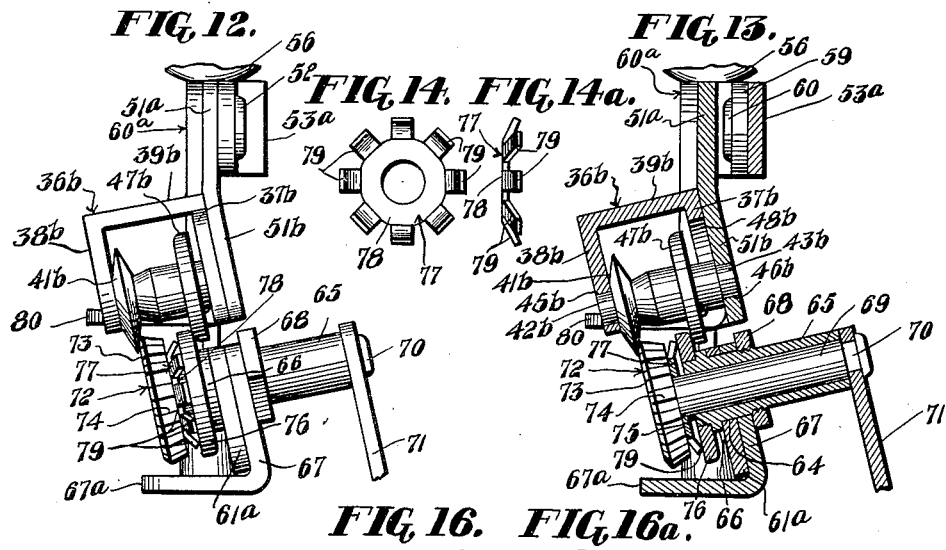
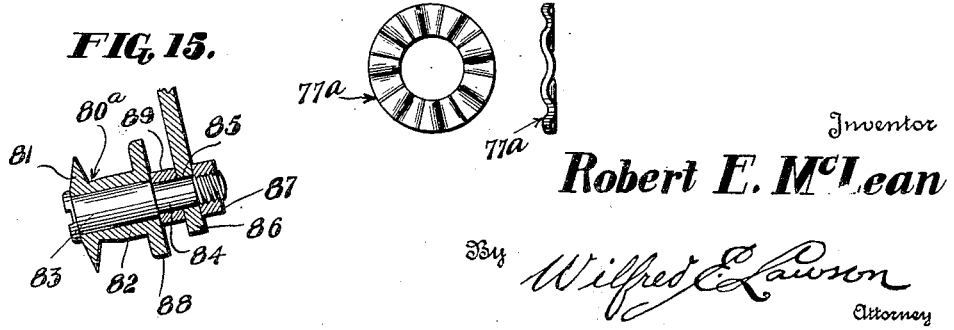

April 15, 1952 — R. E. McLEAN — 2,592,934
CAN OPENER
Filed Feb. 12, 1947 — 4 Sheets-Sheet 4

Inventor
Robert E. McLean
By Wilfred E. Lawson
Attorney

Patented Apr. 15, 1952

2,592,934

UNITED STATES PATENT OFFICE 2,592,934

CAN OPENER

Robert E. McLean, Fort Benning, Ga., assignor to
John C. Hockery, Kansas City, Mo., trustee Application February 12, 1947, Serial No. 728,063

21 Claims. (Cl. 30—9)

This invention relates to improvements in can openers of the rotary drive wheel type.

A principal object of the present invention is to provide a rotary drive wheel type can opener which is designed in a novel manner as regards particularly the rotary can rim engaging parts, to minimize operating friction in all bearings whereby to provide for greater ease of operation and longer bearing life.

Still another object of the invention is to provide in a rotary drive wheel can opener, a novel arrangement of a driving wheel and rotary disk cutter wherein all bearing thrust is essentially radial to the turning axis of the rotatable part to provide for longer bearing life and promote ease of operation.

Still another object of the invention is to provide in a rotary drive wheel type can opener having a rotatable disk cutter, a novel mounting for the parts wherein the axis of the disk cutter parallels the axis of the can rim engaging driving wheel to prevent circumferential engagement of one of these parts with the other incurring any longitudinal thrust against the other.

A still further object of the invention is to provide in a rotary drive wheel type can opener having a rotatably supported disk cutter, a hub for the disk cutter with a collar or flange, preferably integral therewith, of essentially the same diameter as that of the disk cutter for cooperation with the can rim engaging driving wheel or a circular part on the axis of the can rim engaging driving wheel, with the parts arranged whereby the can rim engaging driving wheel, or the can driving wheel and the said circular part on the axis thereof, is wedged between the collar or flange and the disk cutter when the can is engaged in the device for the removal of the can head, the side of the can being gripped between the lateral surface of the can rim engaging driving wheel and the disk cutter for the purpose of supplementing the traction and driving action of teeth of the can rim engaging driving wheel and also to maintain the can in proper alignment in the device during the cutting operation.

A still further object of the invention is to provide a can opener of the character stated in which the collar or flange or the hub of the disk cutter, in cooperation with the can driving wheel or a circular part on the axis of the can driving wheel, takes all lateral or longitudinal thrust near its lateral circumference when the can is engaged in the device so that the side of the can is between the disk cutter and the lateral circumference, thereby eliminating a longitudinal thrust on the disk cutter and the bearing of its hub as well as the journal or journals thereof or on which mounted.

Still another object of the invention is to provide a rotary drive wheel type can opener which is designed to be supported in the hand while in use and wherein means is provided for varying the traction of the lateral circumferential surface of the can rim engaging driving wheel with the side of the can in any amount desired by the operator by the action of increasing or decreasing his grip on the device, without incurring any longitudinal thrust upon either the rotatably mounted disk cutter or the can driving wheel.

Another object of the invention is to provide in a rotary drive wheel type can opener, resilient means by which the can driving wheel may be forced away from a disk cutter a predetermined amount when necessary, such as when passing the seam of a can, such effect being accomplished without imposing any longitudinal thrust to either the disk cutter or the can driving wheel, or to parts to which they are secured.

Still another object of the invention is to provide in a rotary drive wheel type can opener having a disk cutter, means whereby longitudinal thrust in bearings and journals of the disk cutter and of the can driving wheel, is eliminated, thereby preventing conventional wear which causes predetermined lateral spacing of the disk cutter in relation to the can driving wheel to vary, particularly after prolonged use, thereby impairing the efficiency of the device.

A still further object of the invention is to provide in a rotary drive wheel type can opener having a rotatable disk cutter, novel means by which the can driving wheel, or can driving wheel and a circular part on the axis of the can driving wheel, is in direct engagement with the circumferential lateral surface of the disk cutter and the collar or flange of the hub of the disk cutter at all times during operation in such manner that the can driving wheel is urged longitudinally toward the circumferential lateral surface of the disk cutter, thereby assuring that the circumferential lateral surface of the can driving wheel is always maintained against the lateral surface of the can during operation in order that the teeth of the can driving wheel will be in full engagement with the under edge of the can rim or bead, thereby improving traction and preventing the rim of the can from slipping downward on the can driving wheel, even after prolonged use.

Another object of the invention is to provide a rotary drive wheel type can opener of novel construction whereby any expected wear from operation is compensated for through functional operation of affected parts in such novel manner that efficiency of the device will not be impaired, even after extensive use.

Other objects and advantages of the invention will become apparent as the description of the same proceeds and the invention will be best understood from a consideration of the following detailed description taken in connection with the accompanying drawings forming a part of the specification with the understanding, however, that the invention is not confined to a strict conformity with the showing of the drawings but may be changed or modified so long as such changes or modifications mark no material departure from the salient features of the invention as expressed in the appended claims.

In the drawings:

Figure 1 is a view in elevation of the right hand side of a rotary drive wheel type can opener constructed in accordance with one embodiment of the present invention, the same being designed to be held in the hand while in use.

Figure 2 is a view in elevation of the forward or head end of the opener looking at the opposite or left hand side, the handles being broken away.

Figure 3 is a top plan view of the forward or head end of the opener.

Figure 4 is a view in elevation looking toward the head end.

Figure 5 is a vertical transverse section taken substantially on the line 5—5 of Figure 1.

Figure 6 is a partial transverse section taken substantially on the line 6—6 of Figure 1.

Figure 7 is a detail view in side elevation of an alternate type of a rotary disk cutter and mounting therefor.

Figure 8 is a transverse section taken on the line 8—8 of Figure 7.

Figure 9 is a view in elevation of the right hand side of a modified embodiment of the invention forming a part of a mounted or wall supported bracket.

Figure 10 is a view in top plan of the embodiment shown in Figure 9, the operating handle for the structure in both figures being broken away.

Figure 11 is a view in elevation of the left hand side of the bracket supported embodiment shown in Figures 9 and 10.

Figure 12 is a view in front elevation of the bracket supported embodiment.

Figure 13 is a vertical transverse section taken substantially on the line 13—13 of Figure 9.

Figure 14 is a face view of a spring element employed in the bracket supported embodiment.

Figure 14a is an edge elevation of the spring element.

Figure 15 is a detail section of an alternate type of a rotary disk cutter and mounting therefor.

Figure 16 is a face view of an alternate type of spring element.

Figure 16a is an edge view of the alternate type spring element.

Figure 17:
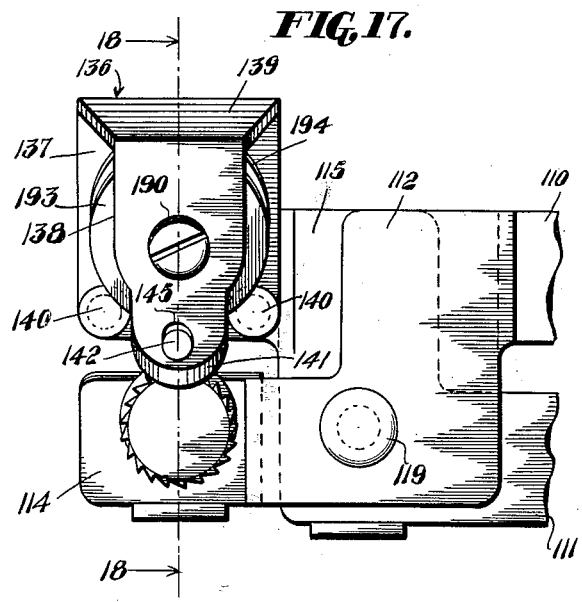
Figure 17 is a view in elevation of the left side of an embodiment of the invention showing a modification of the disk cutter and head construction.

Referring now more particularly to the drawings the embodiment of the invention as illustrated in Figures 1 to 6 inclusive is designed to be held in the hand for use and for this purpose are provided the two handle members 10 and 11 which, in the normal operating position of the parts, are in slightly spaced parallel relation as shown in Figure 1, and in the same vertical plane.

The handle 10 has at its forward end and is integral with the inwardly offset drive wheel supporting head plate 12 which has a lower forwardly directed arm 13, a portion of the free forward end of which is laterally inwardly pressed to provide the inclined terminal section 14.

The lower handle 11 is formed integral at its forward end with the upstanding cutter carrying plate body 15 which, as shown in Figure 3, lies against the outer side of the inwardly offset portion 12 of the handle 10, consequently being disposed in the plane of the handle 10.

The plate 15 carries, or is formed integral with, the inclined terminal forward end portion 16 which is in an offset parallel plane with the terminal part 14.

The angular disposition of the terminal portion 16 of the plate 15 provides a stop shoulder 17 which is in advance of the forward vertical edge 18 of the plate 12.

In the use of the device, when the handles 10 and 11 are separated the edge 18 engages the shoulder 17 to limit such separation.

Separation of the handles is afforded through the medium of the pivot stud or rivet 19 which passes through the juxtaposed plates 12 and 15, adjacent to the bottom edges thereof as shown in Figures 1, 2 and 6. This rivet has one end engaged in and secured to a bow spring 20 which lies vertically against the outer side of the plate 15 and extends downwardly and has a laterally turned lip 21 which engages against the bottom edge of the plate 15 as shown in Figure 6. This lip 21 prevents the spring 20 from turning and the bow of the spring, being directed toward the adjacent plate 15, allows for a certain amount of separation between the plate during certain periods in the operation of the implement.

The terminal portion 14 of the plate 12 has an aperture 22 through which extends the relatively long bearing sleeve 23 which at the inner or left hand side of the terminal portion 14, has a flange 24 which engages against the adjacent face of the portion 14 as shown in Figure 5.

At the right or outer side of the portion 14 the bearing sleeve 23 passes through a plate 25, the lower end portion of which is laterally extended to pass beneath the plate portion 14 and to a substantial distance inwardly or to the left thereof to provide the can rest 26.

Threaded onto the bearing sleeve 23 and pressing against the can rest plate 25 is the securing nut 27. This nut draws the flange 24 of the bearing sleeve against the adjacent plate portion 14 thereby securely fastening the parts together.

Extending through the bearing sleeve 23 is a shaft 28 which carries upon the right or outer side of the implement the thumb and finger crank 29 while upon its opposite end it carries, to the left of the extended portion 14, the can rim flange engaging driving wheel 30.

Between the thumb and finger operating crank or handle 29 and the adjacent end of the bearing sleeve 23, is disposed a spacer collar 32 which encircles the shaft 28 as shown most clearly in Figures 3, 4 and 5.

The shaft 28 carries between the flanged end 24 of the bearing sleeve and the driving wheel 30, a spacer 33, the purpose of which will be hereinafter described.

The can rim engaging driving wheel 30 is peripherally toothed or serrated and has a chamfered portion 34 and a flange engaging portion 35, the function of which portions will be hereinafter set forth.

The numeral 36 generally designates the head frame which carries the rotary disk cutter and its integral parts. This frame 36 comprises the spaced parallel depending portions 37 and 38 and the connecting top portion 39 and, as shown the portion 37 is disposed against the inner side of the inclined terminal portion 16, to which it is secured by rivets 40.

The numeral 41 designates a disk cutter which is provided with inner and outer journals 42 and 43 which engage in bearing apertures formed respectively in the inner portion 38 of the frame 36 and in the extended portion 16 of the plate 15 as indicated at 45 and 46 in Figure 5.

Forming a part of the hub of the cutter wheel 41 is a flange or collar 47 which is beveled as shown in Figures 4 and 5 and which has the beveled face directed inwardly or toward the cutter 41. The beveled portion of this collar 47 is in close proximity to or may have direct contact with the spacer 33 and the chamfered portion 34 of the driving wheel 30 is in close proximity with or may have contact with the side face of the cutter wheel nearest to the collar 47. Thus it will be seen that any movement of the driving wheel and spacer toward the cutter disk 41 and collar 47, will wedge the driving wheel and spacer between the cutting disk and collar. These latter parts are in parallel planes with respect to the cutter disk and collar.

The part 37 of the cutter supporting frame 36 has a recess 48 cut therein in which is located a shoulder 49 which is carried between the collar 47 and the extended portion 16 of the plate 15, in which the journal 43 is mounted.

Figures 7 and 8 illustrate an alternate type of disk cutter. In these views the numeral 16a designates the extension of the lower handle plate and this extension has secured to the inner face thereof, by means of the rivets 40a, the head frame 36a.

In the part 16a is a bearing 46a for the journal 43a. This constitutes the outer journal for the disk cutter 41a and between the cutter and the collar 47a is the inner journal 42a which engages in a bearing recess 45a which is formed in the lower edge of the depending portion 38a of the head frame.

Interposed between the beveled collar 47a and the inner side of the head plate extension 16a is a spacing shoulder 49a.

Figures 9 to 13 inclusive illustrate a mounted embodiment of the present invention wherein the same is supported upon the outer end of a bracket arm 50. This arm is designed to be secured in any suitable manner to a fixed support and since such support forms no part of the present invention the rear end portion of the bracket arm is not shown.

The forward end of the bracket arm constitutes a head plate which is designated 51 and which is cut away at the forward end of the lower edge thereby providing the longitudinally extending upper portion 51a.

The lower part of this forward portion 51a is pressed laterally toward the outer side of the head whereby to produce the inclined cutter carrying part 51b which corresponds to a previously described part 16.

The top edge of the plate 51 extends above the top edge of the arm 50 and at the outer end of the portion 51a adjacent to the top edge of the plate is fixed a pivot stud or rivet 52 to which is pivotally attached upon the outer or right hand side of the head, an end of a vertically movable lever 53. Intermediate its ends this lever has a substantial portion of its length offset from the plate 51 as shown in Figure 10 at 53a whereby to provide a clearance space between a portion of the lever and the plate, for the purpose about to be described.

At its rear end the lever 53 is rolled inwardly as indicated at 54 to provide a vertical sleeve which lies above the top edge of the bracket arm 50 and this sleeve has extending therethrough a pin 55, upon the upper end of which is mounted the knob 56. As shown in Figure 11 the lower end of this pin 55 which secures the knob to the rear end of the lever, rests upon the top edge of the bracket arm 50 when the lever is swung down to horizontal position.

Adjacent to the rear part of the plate 51 in that portion lying above the top edge of the bracket arm 50, is a slot 57 which extends lengthwise of the head.

Slidably engaged in the slot 57 is a pivot stud 58 with which is pivotally coupled an end of a link 59 which lies upon the outer or right hand side of the head plate in the space between such plate and the offset portion 53a of the lever 53, as shown in Figure 10.

The opposite end of the link 59, which normally extends lengthwise of the plate and of the lever 53, is pivotally coupled as at 60 by means of the pivot stud shown, to the forward end portion of the lever 53. Thus it will be seen that when the knob 56 of the lever 53 is swung upwardly the link 59 will be caused to swing on the pivot stud 58 and also this pivot stud will be caused to shift forwardly toward the forward end of the slot 57.

The numeral 60a generally designates a bell crank which is disposed upon the inner or left hand side of the head plate 50. This bell crank has a forwardly directed normally horizontally disposed arm 61 and upwardly extending substantially vertical arm 62. The upper end of the vertical arm 62 has secured therein the pivot stud or rivet 58. At the angle between the arms 61 and 62 the bell crank lever is pivotally joined to the head plate 51 by the pivot stud or rivet 63. Thus it will be seen that when the link 59 is shifted by the raising and lowering of the lever 53, the bell crank will be rocked on the pivot 63 to raise and lower the forward end of the arm 61.

The forward end of the arm 61 of the bell crank has a portion 61a disposed oblique to the plane of the bell crank and in a plane parallel with but offset from the inclined portion 51b of the forward part of the head plate, as shown in Figures 12 and 13.

This portion 61a of the bell crank arm 61 has an opening 64 through which extends a bearing sleeve 65, the inner end of which is provided with the flange 66 which engages against the adjacent side of the portion 61a of the bell crank arm.

Disposed against the outer side of the bell crank arm is a can rest plate 67, the lower end portion of which is turned laterally to pass under the lower edge of the arm and provide the inwardly directed can rest 67a.

At the outer side of the plate 67 the bearing sleeve 65 has threaded thereon a nut 68 which secures these parts together.

Extending through the bearing sleeve 65, is the shaft 69, the outer end of which is squared as at 70 for connection therewith of a crank arm 71. This arm 71 is designed to have a suitable hand knob, not shown, attached to its outer end whereby rotary motion may be imparted to the shaft 69.

The inner end of the shaft 69 has secured thereto the can rim engaging drive wheel 72 which has the chamfered edge portion 73 while the larger portion of the periphery is beveled or tapered outwardly as indicated at 74, for the purpose hereinafter described.

At the end of the bearing sleeve 65 inwardly of the flange 66, the sleeve is formed to provide a journal 75 upon which is mounted the thrust wheel 76.

Encircling the shaft 69 and interposed between the thrust wheel 76 and the can driving wheel 72, is a spring unit which is generally designated 77 and, as shown in Figures 14 and 14a, comprises a washer portion 78 from the periphery of which extends a plurality of spring fingers 79.

Secured to the inner side of the inclined portion 51b of the head plate 51, above the shaft 69, is the cutter wheel supporting frame which is generally designated 36b.

This frame 36b, like the ones previously described, is secured to the supporting plate by rivets, here designated 40b and it has, in addition to the top portion 39b, the depending spaced portions 37b and 38b. The portion 37b is provided with the recess 48b for the purpose about to be described.

Between the portion 38b and the angled plate part 51b is the cutter wheel unit which comprises the cutter wheel or disk 41b and the inner and outer trunnions designated respectively 42b and 43b. These are, respectively, rotatably mounted in bearing openings 45b and 46b. As shown the chamfered edge portion 73 of the driving wheel is disposed in close proximity to or against the adjacent beveled face of the cutter wheel and mounted upon the hub of the cutter wheel is the collar 47b which cooperates with the thrust wheel 76 being disposed upon the outer side of the latter. Thus it will be seen that the driving wheel 72 and the thrust wheel 76 are located between the collar 47b and the cutter disk 41b.

The lower portion of the part 37b of the head frame 36b has formed integral therewith the inwardly extending can rest 80. This can rest is disposed rearwardly of the cutter as shown in Figure 11. While one only is shown there may be used a second can rest forming a part of the member 37b and disposed in front of the cutter if desired. This latter forwardly positioned rest would, however, have little function as it would only be of value in the structure in the event that the operator unintentionally turns the operating crank 71 counterclockwise and thereby causes the can to tip at the forward side. In the use of the device the top edge of the flange or rim of the can would engage the underside of the rest 80 while the side wall of the can would rest against the end of the can rest 67a thereby maintaining the can in the desired position for the most effective action of the cutter and driving wheel.

Figures 16 and 16a illustrate an alternate type of spring which might be used in substitution for the spring 77. This spring is generally designated 77a and, as shown, is of corrugated form and has an opening or hole at its center in order that it may be journaled on the journal portion 75 when such journaled portion is extended sufficiently to support the spring between the driving wheel 72 and the collar 76.

The numeral 80a designates generally a second alternate type disk cutter, the cutter disk itself being designated 81. As shown the cutter disk has formed integral therewith a hub portion 82 through which extends the enlarged portion 83 of an arbor 84. The outer end of the arbor passes through a suitable aperture 85 in the angled portion 86 of the supporting plate and receives upon its threaded end the securing nut 87.

The outer end of the hub portion 82 carries the collar or flange 88 and between this flange and the portion 86 of the plate, the arbor has placed thereon the spacer collar 89 which maintains the flange 88 in spaced relation which the adjacent plate body.

It will be understood that the alternate disk cutter 41a and the alternate cutter support shown in association therewith may be used with any embodiment of the invention here shown, whether mounted or unmounted, the collar or flange 47a being displaced by a collar or flange of the construction of the collar or flange 47b in any construction in which the thrust spring 77 or the thrust spring 77a is used. The same applies with respect to the second alternate type disk cutter 80a together with its support.

In the operation of the device as illustrated in Figures 1 to 6 inclusive, the handles 10 and 11 are first opened to the extreme position or until the edge 18 of the plate 12 engages the shoulder 17. The driving wheel 30 will then be in a predetermined lowered position from the overlying cooperating disk cutter 41. The device is then placed on the cam with the disk cutter 41 resting upon the end of the can and the can guard 26 resting against the side portion of the can. As the holding handles 10 and 11 are then pressed together the can driving wheel 30 will engage the under edge of the rim of the can. As the handles are further pressed together the disk cutter 41 will be forced down through the end of the can to puncture the latter. Further pressing together of the handles is prevented by the can driving wheel 30 and the spacer collar. The spacer 33 being wedged between the disk cutter 41 and the conical collar or flange 47, the side portion of the can also being pressed between the disk cutter and the circumferential portion of the face of the can driving wheel 30. While the handles are held pressed together the thumb and finger operating handle 29 is rotated clockwise until the end is cut out of the can, at which time the handles are separated to the extreme position and the device is removed from the can.

While cutting out the end of the can, the resiliency of the spring 20 permits the can driving wheel 30 to be forced away from the disk cutter 41 a predetermined amount when necessary, such as when passing the seam of the can, and during such action the spacer 33 is forced outwardly such amount on the conical surface of the collar or flange 47.

The upward thrust on the disk cutter 41, during the cutting operation, is nearly adequate to provide traction of the teeth of the can driving wheel 30 with the under edge of the rim of the can. Such traction is supplemented by sufficient lateral traction obtained with the side portion of the can by pressing the said side portion of the can between the disk cutter 41 and the circumferential face of the can driving wheel 30, such additional traction being regulated at the will of the operator by the amount of grip or pressure exerted in pressing the handles 10 and 11 together, thereby wedging the side or lateral portion of the can, the can driving wheel 30 and the spacer 33 between the disk cutter 41 and the conical collar or flange 47.

The angularity of the conical collar or flange 47 would be such as to best produce the desired effect with the greatest amount of ease of operation. It will be seen that the lateral thrust exerted against the disk cutter 41 is not transmitted to any lateral bearing during the cutting operation, but is offset by the wedging action of the can driving wheel 30 and the spacer 33, together with the lateral portion or side of the can, between the said disk cutter 41 and the conical collar or flange 47. This action, essentially, reduces all bearing thrust to radial thrust only during the cutting operation, thereby greatly facilitating operation and reducing or eliminating all bearing wear of the most harmful type. Inasmuch as the axis of the disk cutter generally designated 41, parallels the axis of the shaft 28 of the can driving wheel 30, there is little or no tendency for any part to be urged longitudinally during the cutting operation, further reducing or eliminating the most undesirable harmful wear and further facilitating operation.

In as much as the axis of the disk cutter 41 parallels the axis of the shaft 28 of the can driving wheel 30, and the diameter of the spacer 33 is essentially the same as the diameter of the can driving wheel 30, a rolling contact action without noticeable friction is had, even when maximum pressure is applied to the holding handles 10 and 11 to effect the wedging action required at any time to provide positive traction of the can driving wheel with the can.

The anti-frictional relationship between the spacer 33 and the conical collar or flange 47 is not impaired as the contacting portion of the spacer 33 rides upon the conical collar 47 at different diameters, in as much as the circumferential face of the can driving wheel 30 will assume a corresponding diameter contact with the disk cutter 41. It will be readily seen that constant pressure on the holding handles 10 and 11 maintains the teeth of the can driving wheel 30 against the lateral portion of the can at all times during the cutting operation, thereby assuring that the radial portions of the teeth engage the full width or thickness of the under edge of the rim of the can, thereby providing better traction and preventing the can driving wheel from escaping upwardly from the under edge of the rim of the can.

It will be seen that the can driving wheel 30 and the spacer 33 do not move upwardly in a plane perpendicular to the axis of the disk cutter 41, but rather that they move upwardly in a vertical plane approximating that of the side or lateral portion of the can. It will be observed that the lateral circumferential friction incident to operation of the device during the cutting operation, is negligible in comparison with friction inherent in other designs wherein lateral thrust must be taken by bearing journals. It is not intended that the hub of the disk cutter 41 be of sufficient diameter that it will bear on the rim of the can at any time. However, such hub may be of sufficient diameter to prevent the disk cutter from accidentally assuming too great a depth through the end of a can after the same has been punctured by the cutter.

In the operation of the embodiment of the invention illustrated in Figures 9 to 13 the can puncturing lever 53 is lifted upwardly and toward the operator until in extreme raised position, the rivet 58 engaging the end of the slot 57, preventing further movement. This action effects the oscillation of the bell crank 60a, thereby lowering the can driving wheel 72 to starting position.

It will be noted that in lifting the handle 53 a pull is applied to the link 59, as previously described, whereby to bring about the oscillation of the bell crank in a manner which will be readily apparent.

The can is then placed with its upper end against the disk cutter 41b. The can puncturing lever 53 is then forced rearwardly and downwardly until in the position in which it is shown in Figures 9 and 11, such movement being limited by the engagement of the pin 55 with the top edge of the bracket 50, this causes reverse rocking movement of the bell crank, thereby raising the driving wheel 72 and causing the cutter 41b to penetrate the top of the can. The crank arm 71 is then rotated clockwise until the end of the can is cut out, at which time the can puncturing lever 53 is again lifted as was done for setting the device in starting position, thus releasing the can from the device.

At approximately the time the end of the can is punctured by the cutter 41b, the thrust wheel 76 will engage the collar or flange 47b of the hub of the disk cutter, forcing the top of the thrust wheel 76 toward the can driving wheel 72, thereby flexing the spring 77 in such manner that the lateral or side portion of the can, the can driving wheel 72, the spring 77 and the thrust wheel 76 are wedged between the disk cutter 41b and the collar 47b.

The can rest 80 prevents the can from tilting during the cutting operation.

While cutting out the end of the can, the resiliency of the spring 77 permits the can driving wheel 72 to be forced away from the disk cutter 41b a predetermined amount when necessary, such as when passing the seam of the can, against the resiliency of the said spring 77.

The traction of the teeth of the driving wheel with the under edge of the rim of the can resulting from the upward thrust on the disk cutter during the cutting operation is supplemented by sufficient lateral traction obtained with the side portion of the can by the pressure exerted by the spring 77, thereby pressing the lateral or side portion of the can between the disk cutter 41b and the circumferential face of the can driving wheel 72, the spring 77 exerting sufficient pressure at all times to assure positive traction of the can driving wheel with the can.

It will be seen that the lateral thrust exerted through the disk cutter 41b is not transmitted to any lateral bearing during the cutting operation but is offset by the wedging action of the can driving wheel 72, together with the lateral portion of the can, the spring 77 and the thrust wheel 76 between the said disk cutter 41b and the collar or flange 47b.

It will be readily apparent that in this latter embodiment the spring 77 performs the functions of the spring 20 of the first embodiment and that the features of advantage to be found in the first mentioned embodiment are present also in the present or second embodiment.

Figure 18:
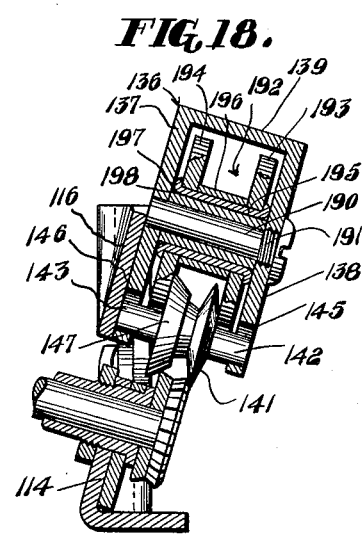
Figure 18 is a vertical transverse section taken on the line 18—18 of Figure 17.

Figures 17 and 18 illustrate the unmounted embodiment of a can opener constructed in accordance with the present invention and corresponding particularly with the structure shown in Figure 2, but showing a modification of one embodiment of the disk cutter and head construction as illustrated and described in my Patent No. 2,466,117 issued April 5, 1949.

In these structures shown in Figures 17 and 18 the numerals 110 and 111 designate the two handle members corresponding to the handles 10 and 11 shown in Figure 2, the handle 110 being integral with the plate 112 and the handle 111 being integral with the plate 115 as in the structure previously described, the plates being pivotally joined together by the rivet 119.

As in the structure of Figure 2, the plate 115 carries, or is formed integral with, the inclined terminal portion 116, which terminal forward end portion is in an offset parallel plane with the forward end terminal portion 114. The latter portion carries the can wheel rim engaging and driving parts and since these are of the same design and construction as shown in Figure 5 it is believed that a detailed description of the same need not be repeated.

The modified disk cutter and head construction is generally designated 136 which, as shown, is in the form of a frame comprising the spaced parallel depending portions 137 and 138 and the connecting top portion 139. The outer or right hand side portion 137 is secured by the rivets 140 to the inclined forwardly extending portion 116.

The numeral 141 generally designates the disk cutter with which is integrally joined the inner journal 142. Integral with the disk cutter is the collar or flange 147 which is of conical form as shown and cooperates with the cutter 141 in the same manner as the flange 47 previously referred to. Extending from the outer side of the collar 147 is the outer journal 143 which, of course, forms an integral part with the inner journal 142 as will be readily apparent.

In the portions 137 and 138 of the frame are formed the inner and outer bearings 145 and 146 respectively which, as shown, are of elliptical form whereby slight up and down movement of the journals together with the cutter and collar, is permitted.

Disposed above and in spaced parallel relation with the connected journals 142 and 143 is the journal screw 190 which extends through the inner and outer parts 137 and 138 of the cutter head and is threadably secured to the inner part 138 as indicated at 191.

The numeral 192 generally designates the thrust wheel assembly which, as shown, comprises the inner and outer thrust wheels 193 and 194 which are mounted upon the tubular rivet 195. Encircling the rivet and functioning as a spacer for the wheels, is the spacer sleeve 196 and the wheels are maintained firmly against the ends of the sleeve by the turned over ends 197 of the rivet, as shown in Figure 18.

The tubular rivet 195 encloses a bearing 198 through which the journal screw 190 passes and this bearing is of a length substantially equal to the distance between the opposed inner faces of the parts 137 and 138 of the cutter head structure. The construction of the cutter head assembly, as just described, is operated in substantially the same manner as that illustrated in Figures 1 to 6 inclusive. However, the thrust wheel assembly 192, materially reduces friction and thereby provides for much easier operation of the cutter.

Figure 19:
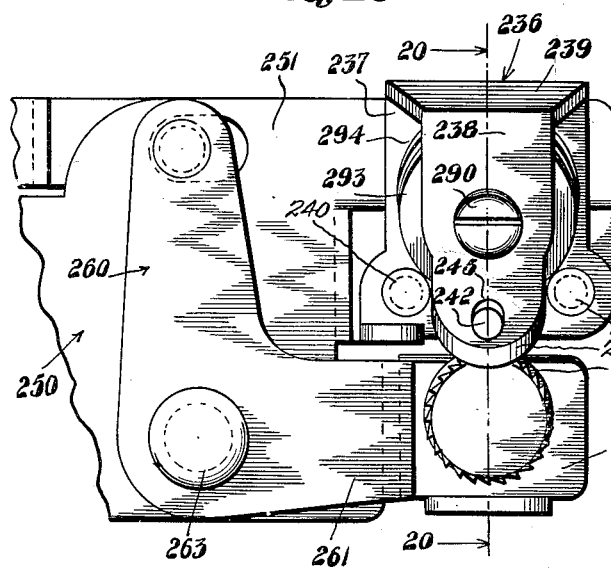
Figure 19 is a view in side elevation of the left side of a mounted embodiment of the invention and showing a modification of the disk cutter and head construction.
Figure 20:
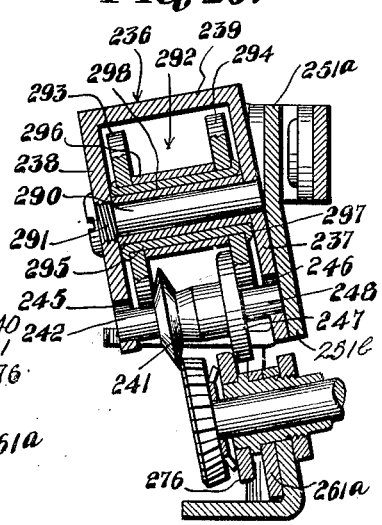
Figure 20 is a vertical transverse section taken on the line 20—20 of Figure 19.

Figures 19 to 20 illustrate the application of the modified disk cutter and head construction to the mounted embodiment of the invention illustrated particularly in Figure 11. In the showing of these figures certain of the parts are of the same design and connected together in the same manner as the parts shown in Figure 11 and therefore such parts will merely be generally referred to.

The numeral 250 generally designates the supporting arm which, at its outer end, is suitably enlarged to provide the plate portion 251, a part of which is extended forwardly to provide the cutter head supporting means 251a.

Pivotally supported upon the rivet 263, upon the inner or left hand side of the device, is the bell crank 260, the forwardly extending arm 261 of which is disposed at an angle as indicated at 261a to conform to the angular disposition of the portion 251b and to have a parallel relation therewith. This extension arm 261a carries the can rim engaging and driving wheel and the other parts associated therewith, which parts are duplicates of those shown in Figure 13 and accordingly it is not believed that a detail description of the same is necessary.

The cutter head construction is generally designated 236 and comprises the outer and inner depending parallel portions 237 and 238 respectively, the same being connected by the intermediate top portion 239.

The numeral 241 designates the disk cutter which is integral with the inner journal 242. Connected with the disk cutter at the outer side thereof is the hub collar 247 with which is integrally connected the outer journal 248. These journals are mounted in the elliptical bearings 245 and 246 and, as shown, the disk or collar 247 cooperates with the spring pressed wheel 276 which is in spaced relation with the can rim engaging driving wheel.

Supported between the depending portions 237 and 238 of the head frame is the screw journal 290 which, as in the structure shown in Figure 18, has the inner end threadably secured as indicated at 291, in the depending portion 238.

The thrust wheel assembly 292 comprises the two wheels 293 and 294 which are mounted upon the tubular rivet 295. The rivet is encircled by the spacer sleeve 296 which maintains the wheels in proper spaced relation and the turned over ends 297 of the rivet maintain the wheels firmly against the sleeve 296.

Extending through the tubular rivet 295 is the bearing 298 through which the pivot screw 290 passes.

It will be readily apparent that the construction shown in Figures 19 and 20 is operated in the same manner as that shown in Figures 9 to 13. It will also be readily apparent that this thrust wheel assembly materially reduces friction and thereby provides for easier operation of the device.

In both embodiments as shown in Figures 17 and 18 and in Figures 19 and 20 it will be seen that the thrust wheels bear against the journals with which the cutter disk and collar are joined and the elliptical bearings provide for a slight floating action of the journals so that as the journals turn they will be in firm contact with the thrust wheels and rotation of the journals will be made easier and at the same time, due to the fact that the disk cutter and the adjacent collar or flange are held between the inner faces of the thrust wheels, axial movement of the cutter and attached collar is not permitted.

As provided in my Patent No. 2,466,117 of April 5, 1949, either the journal screw 190 or 290 may be positioned with its axis at any desired point rearward of the axis of the disk cutter in order to effect easiest rotation of the disk cutter.

It is to be understood that, if desired, the first embodiment can be provided with the can driving wheel and cutter construction illustrated and described for the second embodiment by limiting the pressing together of the holding handles to a predetermined position and substituting the thumb and finger handle for the crank arm. In such construction, as in the second embodiment, traction of the can driving wheel with the side of the can would not be dependent on the amount of grip exerted by the operator on the pair of holding handles.

It is to be further understood that, if desired, the first embodiment can be provided with either one or two can rests in the same manner as provided for the mounted embodiments.

Notwithstanding that the can driving wheel has been described as chamfered in order that the circumferential face thereof essentially parallels the adjacent disk cutter, it is to be understood that such can driving wheel can be not chamfered at its circumferential face, if desired; and, also, if desired, the wheel can be knurled instead of toothed.

I claim:

1. In a can opener of the rotary drive wheel type, a body, a disk cutter rotatably carried thereby, a second body pivoted to the first body, a can rim engaging drive wheel carried by the second body for movement relative to the cutter upon relative oscillation of the bodies, the axes of the can driving wheel and disk cutter being parallel and said axes being disposed at an angular relationship to the axis of the pivot connecting said bodies, means for resiliently wedging the wheel toward a side face of the cutter disk by the action of moving the wheel and cutter into cooperative working relation for maintaining driving engagement between a part of the wheel and the wall of the can below the rim, and means for rotating the wheel.

2. In a can opener of the rotary drive wheel type, a pair of pivotally coupled bodies, a rotary disk cutter carried by one body, a rotary can rim engaging drive wheel carried by the other body, the axes of the can driving wheel and disk cutter being parallel and said axes being disposed at an angular relationship to the axis of the pivot connecting said bodies, the cutter and wheel being so relatively disposed that the peripheries of the cutter and wheel are moved into overlapping relation upon a prescribed relative pivotal movement of the bodies, means yieldingly keeping the adjacent surfaces of the cutter and wheel overlapping when in working relation, means for turning the wheel and coacting cone thrust means carried adjacent to the cutter and wheel for effecting an increased traction between the cutter and wheel and a portion of a can wall interposed therebetween upon increased forcible movement of the cutter and wheel peripheries into the stated overlapping relation.

3. In a can opener of the rotary drive wheel type, a pair of pivotally coupled bodies having two spaced parallel portions movable toward and away from one another, a rotary disk cutter carried by one portion, a rotary can rim engaging driving wheel carried by the other portion and turning on an axis paralleling the rotary axis of the cutter, the cutter and wheel being relatively positioned to have their peripheries brought into overlapping contacting relation upon movement of said portions together, means whereby the wheel is movable axially relatively to the cutter, yieldable means normally resisting movement of the wheel axially away from the cutter, coacting circular thrust members one adjacent to and concentric with the cutter and the other member adjacent to and concentric with the wheel, said members being rotatable with the cutter and wheel and having overlapping coacting relation, and means for turning the wheel.

4. In a can opener of the rotary drive wheel type, a pair of pivotally coupled bodies having two spaced parallel portions movable toward and away from one another upon pivotal movement of one body upon the other, a rotary disk cutter carried by one portion, a collar in spaced concentric relation with the cutter, a rotary can rim engaging driving wheel carried by the other portion for turning on an axis paralleling the rotary axis of the cutter, a thrust wheel concentric with the driving wheel and supported for rotation therewith, the disk cutter and collar being movable as a unit toward and away from the driving wheel and thrust wheel as a second unit, the peripheries of the driving wheel and thrust wheel being movable to operative position between and in overlapping relation respectively with the cutter and collar unit whereby a portion of the periphery of the driving wheel is in opposed operative relation with a side of the cutter adjacent to the periphery of the latter, means for rotating the driving wheel, and means yieldably opposing axial movement of the driving wheel away from the peripheral portion of the cutter.

5. A can opener of the character stated in claim 4, wherein said yieldable means comprises a spring member disposed at one side of one of said pivotally coupled bodies, the spring member being secured in position by attachment to the pivot element between the bodies, said pivot element comprising a pivot pin passing through the bodies and having a length to permit movement of one of the bodies on the pin toward and away from the other body against the tension of the spring.

6. A can opener structure of the character stated in claim 4, wherein said thrust wheel is mounted for axial movement relative to the adjacent driving wheel, and said yieldable means comprises a spring element interposed between the thrust wheel and driving wheel to normally urge separation of the latter.

7. In a can opener of the rotary drive wheel type, a pair of flat bodies disposed in side by side relation, a pivot coupling between the same, means for effecting relative oscillation of the bodies on the pivot coupling, two spaced parallel portions carried by the bodies and adapted to be moved toward and away from one another upon said relative oscillation of the bodies, said portions being flat and in planes inclined from the planes of the bodies, a rotary cutter unit supported by one portion for turning on an axis normal to the plane of the supporting portion and including a cutter disk and a collar spaced from the disk, a driving unit supported on the other portion for rotation on an axis normal to the plane of the supporting portion and including a can rim engaging driving wheel and a thrust wheel spaced from the driving wheel, said driving unit wheels being spaced apart for the entrance of their peripheries in the space between the cutter disk and collar whereby a portion of the drive wheel periphery coacts with a side portion of the cutter disk periphery for driving engagement with the wall of a can adjacent to the can rim beneath which the driving wheel engages, means facilitating axial movement of the driving wheel for the passage of a can seam between the driving wheel and cutter disk, and means for rotating the driving wheel.

8. A can opener of the character stated in claim 7, wherein the means facilitating said axial movement of the driving wheel comprises a pivot coupling between the bodies in the form of a pin member of a length to facilitate lateral movement of one body away from the other, and a spring element secured to said pivot pin and engaging the said one body to oppose the stated lateral movement thereof.

9. A can opener structure of the character stated in claim 7, wherein the said means facilitating axial movement of the driving wheel comprises a mounting for the thrust wheel which facilitates axial movement of the thrust wheel and the driving wheel one relative to the other, and a spring element interposed between the thrust wheel and the driving wheel and normally opposing movement of the wheels one toward the other.

10. A can opener of the character stated in claim 7, wherein the said collar is beveled on the side adjacent to the cutter and the periphery of the thrust wheel moves toward and is adapted to have contact with the beveled surface of the collar, the said means facilitating axial movement of the driving wheel comprising a pivot coupling in the form of a relatively long pin upon which one of the flat bodies moves laterally with respect to the other body, and a spring secured to the pivot pin and having contact with the said one of the flat bodies and normally opposing its lateral movement away from the adjacent body.

11. In a can opener of the rotary drive wheel type, a pair of plate bodies disposed in side by side contacting relation, an arm integral with each plate body, one of the arms being laterally offset with respect to the plate body of which it forms a part whereby to position the arms in a common plane one above the other, a relatively long pivot pin extending through the plate bodies and projecting at one end beyond the outer side of one body, a bow spring disposed against the said outer side of the said one body and having the projecting end of the pivot pin secured thereto and functioning to yieldably maintain the bodies in contacting relation, two spaced parallel portions carried by the bodies and extending therefrom in a direction away from the handles, said portions being flat and disposed in planes inclined from the planes of the bodies, a rotary cutter unit supported by one portion for turning on an axis normal to the plane of the supporting portion and including a cutter disk and a collar spaced from the disk, a driving unit supported on the other portion for rotation on an axis normal to the plane of the supporting portion and including a can rim engaging driving wheel and a thrust wheel spaced from the driving wheel, the opening and closing of said handles effecting the movement of said units toward and away from one another, said driving unit wheels being spaced apart for the entrance of their peripheries between the cutter wheel and the collar whereby a portion of the drive wheel periphery coacts with a side portion of the cutter wheel periphery to secure between them the wall of a can adjacent to the can rim beneath which the drive wheel engages, said collar being peripherally beveled on the side adjacent to the cutter wheel for contact by the periphery of the thrust wheel, and means for rotating the driving wheel.

12. In a can opener of the rotary drive wheel type, a body plate having a forward end portion disposed oblique to the plane of the plate, a bell crank pivotally mounted upon one side of the body plate and including an upwardly extending arm and a forwardly extending arm, a portion of the forwardly extending arm being disposed oblique to the plane of the body plate and below and in a plane parallel to the said forwardly extending portion of the body plate, means carried by the body plate and operatively coupled with the upwardly extending arm of the bell crank for effecting oscillation of the bell crank and movement of the said forward portion thereof toward and away from the said forward portion of the body plate, a rotary cutter unit supported by the said oblique forward portion of the body plate for turning on an axis normal to the plane of such supporting portion and including a cutter disk and a collar spaced from the disk, a driving unit supported upon the said oblique forward portion of the bell crank for rotation on an axis normal to the plane of such supporting portion and including a can rim engaging driving wheel and a thrust wheel spaced from the driving wheel, said driving unit wheels being spaced apart for the entrance of their peripheries between the cutter disk and collar whereby a portion of the driving wheel periphery coacts with a side portion of the cutter disk periphery to secure between them the wall of a can adjacent to the can rim beneath which the driving wheel engages, said thrust wheel being supported for axial movement relative to the adjacent driving wheel, spring means between the thrust wheel and the driving wheel normally urging said wheels apart, and means for rotating the driving wheel.

13. A can opener structure of the character stated in claim 11, wherein the driving wheel is chamfered on the peripheral edge nearest to the cutter disk to present a flat peripheral surface for coaction with the adjacent side face of the cutter disk.

14. A can opener of the character stated in claim 12, wherein the peripheral edge of the driving wheel adjacent to the cutter disk is chamfered to present a flat peripheral surface to the adjacent face of the cutter disk with which it coacts.

15. A can opener of the rotary drive wheel type as set forth in claim 7, wherein the rotary cutter unit includes supporting journals, a journal in spaced parallel relation with the unit journals, and thrust wheels on said journal and having peripheral bearing on the unit journals with the cutter disk and collar positioned therebetween.

16. A can opener of the rotary drive wheel type as set forth in claim 12, wherein said rotary cutter unit includes supporting journals, a journal supported in spaced parallel relation with the unit journals, and thrust wheels on said journal and having peripheral bearing on the unit journals with the cutter disk and collar positioned therebetween.

17. A can opener of the rotary drive wheel type as set forth in claim 3, with a journal supporting said rotary disk cutter, a second journal in spaced parallel relation with the cutter journal, and a pair of wheels carried by the second journal and bearing at their peripheries upon the cutter journal upon opposite sides of the cutter and providing a roller bearing for the cutter journal.

18. A can opener of the rotary drive wheel type as set forth in claim 3, with a rotatable journal carrying the disk cutter, a second journal supported in spaced parallel relation with the cutter journal, a bearing enclosing the second journal, a tubular rivet enclosing the bearing, a pair of wheels having said tubular rivet passing therethrough and having their peripheries in rolling contact with the first journal upon opposite sides of the cutter, a spacer sleeve between said pair of rollers, and said tubular rivet having its ends turned outwardly and engaging against the adjacent faces of the wheels and securing said wheels against the intervening spacer, said pair of wheels forming a rolling bearing for the cutter journal.

19. In a can opener of the rotary drive wheel type, a pair of pivotally coupled bodies having two spaced parallel portions movable toward and away from one another, a rotary disk cutter carried by one portion, a rotary can rim engaging driving wheel carried by the other portion and turning on an axis paralleling a rotary axis of the cutter, the cutter and wheel being relatively positioned to have their peripheries brought into overlapping contacting relation upon movement of said portions together, coacting circular thrust members one adjacent to and concentric with the cutter and the other member adjacent to and concentric with the wheel, said members being rotatable with the cutter and wheel and having overlapping contacting relation at their peripheries, and means for turning the wheel.

20. A can opener construction as set forth in claim 19, wherein the circular member adjacent to and concentric with the wheel and the wheel lie in planes passing between the cutter and the circular member adjacent to and concentric therewith.

21. A can opener construction as set forth in claim 19, wherein the circular member adjacent to and concentric with the wheel and the wheel lie in planes passing between the cutter and the circular member adjacent thereto and the circular member adjacent to and concentric with the cutter has a beveled edge face on the side nearest to the other circular member and against which the periphery of the said other circular member contacts.

ROBERT E. McLEAN.

REFERENCES CITED

The following references are of record in the file of this patent:

UNITED STATES PATENTS

| Number | Name | Date |
|---|---|---|
| 1,838,525 | Bunker | Dec. 29, 1931 |
| 2,070,261 | Dazey | Feb. 9, 1937 |
| 2,148,130 | Murdock | Feb. 21, 1939 |
| 2,158,319 | Bloomfield | May 16, 1939 |
| 2,278,731 | Olschewski | Apr. 7, 1942 |